Patented June 8, 1943

2,321,542

UNITED STATES PATENT OFFICE 2,321,542

PREPARATION OF ALKOXY ALCOHOLS

Richard E. Brooks, Wilmington, Del., assignor to E. I. du Pont de Nemours & Company, Wilmington, Del., a corporation of Delaware No Drawing. Application March 16, 1940, Serial No. 324,378

11 Claims. (Cl. 260—615)

This invention relates to unsymmetrical acetals and a process for their preparation, and more particularly to the (alkoxy alkoxy) alcohols and production thereof by the interaction of an aldehyde, a monohydric alcohol, and a polyhydric alcohol.

Acetals, generally, have been produced by the oxidation of alcohols with manganese dioxide and sulfuric acid, the aldehyde, formed at first, uniting with the alcohol with simultaneous separation of water. They have likewise been formed by the treatment of alcohols with trioxymethylene utilizing ferric chloride and syrupy phosphoric acid as the catalyst. They are generally more stable than the aldehydes and have been employed frequently instead of the aldehyde for carrying out condensation reactions. Their usefulness in these and other fields has been limited due to the difficulties encountered in their preparation and the resulting relatively high cost of the products.

An object of the present invention is to provide an improved process for the preparation of unsymmetrical acetals. A further object is to provide a process for the preparation of alkoxy alkoxy alcohols by the interaction of an aldehyde with an aliphatic (or aryl substituted aliphatic) monohydric alcohol and an aliphatic (or aryl substituted aliphatic) polyhydric alcohol. Still another object is to provide conditions and catalysts with which such reactions can be conducted. Other objects and advantages of the invention will hereinafter appear.

The process of the invention may be realized by reacting, preferably while under reflux, an aldehyde, such as formaldehyde, and a monohydric alcohol such as methanol, with a polyhydric alcohol such as ethylene glycol, preferably in the presence of an acidic catalyst. When equilibrium has been substantially reached, the catalyst, if any, is neutralized and the symmetrical acetal, unreacted alcohol, the desired unsymmetrical acetal and by-product water, are removed by fractional distillation which effectively separates these materials, the high boiling residue being recycled.

The reaction is preferably conducted under reflux at one atmosphere pressure, although super or sub-atmospheric pressures may be employed if desired. The temperature of the reflux will, of course, be determined by the nature of the constituents being reacted and the pressure superimposed on the reactants. Thus, at one atmosphere, the reflux temperature for the reaction of formaldehyde and methanol with the polyhydric alcohols or their ethers is approximately 41.8° C.; if ethanol is employed instead of methanol, the temperature of reflux will be approximately 74.2° C.; and generally the monohydric alcohol used will determine the temperature of reflux.

It has been indicated that the reaction proceeds preferably in the presence of an acidic type catalyst such, for example, as sulfuric acid, paratoluene sulphonic acid, camphor sulphonic acid, hydrochloric acid or other acid catalyst of this general character. Such catalyst should preferably be present in amounts ranging between 0.001 to 0.1 part thereof per part of the formaldehyde reacted.

Inasmuch as the reaction involves stoichiometrically the interaction of equimolecular proportions of the aldehyde monohydric alcohol and polyhydric alcohol to be reacted, there should be employed, theoretically, substantially equimolecular proportions of the formaldehyde and the alcohols. It has been found, however, that because appreciable quantities of the symmetrical acetal are formed, it is preferable in a batch process to have in the order of 3 moles of the monohydric alcohol to 2 moles of the aldehyde to 1 mole of the polyhydric alcohol; while if a recycle process is to be used, the one/one/one ratio holds.

Generically the reaction may be illustrated as proceeding in accord with the following equation:

(1)  RCHO+ROH+HOC$_n$H$_{2n}$X→

wherein R is a hydrocarbon radical; X is a hydroxy, alkoxy, or aryloxy group, and $n$ is an integer greater than 1. More specific equations of the above generic reaction are illustrated below:

(2)  CH$_2$O+CH$_3$OH+HOCH$_2$CH$_2$OH→
H$_2$O+CH$_3$OCH$_2$OCH$_2$CH$_2$OH (3)  CH$_2$O+CH$_3$OH+HOCH$_2$CH$_2$OR→
H$_2$O+CH$_3$OCH$_2$OCH$_2$CH$_2$OR (4)  CH$_2$O+C$_2$H$_5$OH+HOCH$_2$CH$_2$OCH$_3$→
H$_2$O+C$_2$H$_5$OCH$_2$OCH$_2$CH$_2$OCH$_3$

Equation 2 illustrates the interaction of, for example, formaldehyde, methanol, and ethylene glycol to give (methoxy methoxy) ethanol, i. e., mono (methoxy methyl) ether of ethylene glycol; Equation 3 illustrates the preparation of an ether of the alcohol produced in Equation 2, a specific example of which may be characterized as methyl, beta-(methoxy ethyl) formal,

and 4, the preparation of ethyl, beta-(methoxy ethyl) formal.

It has been stated that the reaction is carried out until equilibrium has been substantially reached. If an acid catalyst is employed, the removal of the product is effected by distillation after destroying the catalyst, while if the reaction is conducted in the absence of a catalyst, the unsymmetrical formal is preferably removed as formed by extraction or otherwise.

Examples will now be given illustrating preferred embodiments of the invention, but it will be understood that the invention is not restricted to the particular details thereof. The parts are by weight unless otherwise indicated, and conversions are based on the weight of product over the weight of formaldehyde introduced.

*Example 1.*—100 parts (100 moles) of ethylene glycol, 99.3 parts (204.8 moles) of formaldehyde, 154.7 parts (299.3 moles) of methanol, and 53.6 parts (184.4 moles) of water were refluxed in the presence of 2.8 parts (0.03 mole) of concentrated sulfuric acid with a head temperature of approximately 41.8° C. for 2 hours, the pot temperature being between 66° and 69° C. After refluxing, the catalyst was neutralized with CaO (a metal alkoxide such as sodium methoxide may be used if desired) and the product was fractionally distilled giving approximately 49.6 parts (29.0 moles) of methoxy methoxy ethanol.

*Example 2.*—Two moles each of formaldehyde, methanol, and ethylene glycol were heated under reflux in the presence of approximately 0.7% sulfuric acid. The reaction was continued for approximately 2 hours, the resulting products were then cooled, made alkaline with calcium oxide and the resulting neutralized mixture fractionally distilled. 43.7 parts of (methoxy methoxy) ethanol was recovered, giving substantially a 24.0% yield based on the theoretical yield.

*Example 3.*—Into a reaction vessel provided with a reflux condenser was charged 64.6 parts of para formaldehyde, 10.7 parts of water, 124.4 parts of ethylene glycol, 2.1 parts of concentrated sulfuric acid, and 65.0 parts of methanol. This mixture was heated under reflux for approximately one hour during which the bath temperature was at approximately 90° C. After cooling, the solution was made alkaline with 4.0 parts of calcium oxide and the thus neutralized mixture fractionally distilled to give 38.4 parts of (methoxy methoxy) ethanol.

The residue, free of the methylal-methanol azeotrope and (methoxy methoxy) ethanol, may be acidified with sulfuric acid, make-up formaldehyde, water, ethylene glycol, and methanol added, and the refluxing continued for another period of one hour whereby the process is made continuous and a higher conversion of the ethylene glycol to (methoxy methoxy) ethanol realized.

*Example 4.*—The procedure carried out in Example 3 was followed using a reaction mixture containing 64.5 parts of para formaldehyde, 34.1 parts of water, 65.1 parts of methanol, 124.7 parts of ethylene glycol, and 2.0 parts of concentrated sulfuric acid. 38.0 parts of (methoxy methoxy) ethanol was obtained in a single cycle.

*Example 5.*—A reaction mixture containing 129.9 parts of para formaldehyde, 61.3 parts of water, 193.6 parts of methanol, 125.1 parts of ethylene glycol, and 3.5 parts of concentrated sulfuric acid was heated under reflux for approximately 2 hours with a bath temperature in the proximity of 75° C. The temperature of the reaction mixture rose gradually to 69° C. in 0.8 hour and then gradually tapered off to a temperature in the neighborhood of 66° C. at the end of two hours. The reaction mixture was then cooled, made alkaline with 25% solution of sodium methoxide and carefully distilled. 62.0 parts of (methoxy methoxy) ethanol was recovered. If desired, the residue may be treated with additional methanol and sulfuric acid and redistilled to recover formaldehyde and ethylene glycol, which are present in the residue combined as high boilers.

*Example 6.*—A mixture containing in parts by weight 179 parts of actaldehyde (as paraldehyde), 190 parts of methanol, 128 parts of ethylene glycol, 43.5 parts of water, and 6.4 parts of concentrated sulfuric acid was heated under a reflux condenser, the reaction vessel being immersed in a bath maintained at a temperature of 80° C. The reaction was continued for approximately 1 hour, the non-permanent vapors, collected in a cold trap, then returned to the reaction mixture, and the reaction continued at substantially the same temperature for 2 more hours. 13 parts of calcium oxide were then added to neutralize the acid catalyst. The low boilers including acetaldehyde, 1,1 dimethoxy ethane, unreacted methanol, and water were partially flashed off at approximately 40 mm. The distillate was subjected to fractionation and 42.3 parts of beta-(methoxy alpha ethoxy) ethanol,

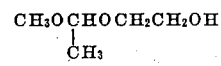

was obtained. It is a water-white liquid, having a refractive index of 1.4135 at 25° C., soluble in water, aromatic hydrocarbons, ketones, and ethers.

In addition to the ethylene glycol disclosed in the above examples, other polyhydric alcohols may be reacted with the monohydric alcohol and formaldehyde such as propylene glycol, butylene glycol, diethylene glycol, triethylene glycol, and the higher homologous polyhydric alcohols, as well as glycerol, erythritol, sorbitol, etc.; as the ethers of the glycols such, for example, as the monoalkyl ethers of ethylene glycol, more specifically, monomethyl ether of ethylene glycol, monoethyl ether of ethylene glycol, monomethyl, monoethyl, and monobutyl ethers of diethylene glycol, monoethyl ether of glycerol and the higher ethers of glycerol, providing, of course, there remains in the glycerol molecule at least one hydroxyl group to react with the formaldehyde to give the unsymmetrical acetal.

Compounds which react to form the glycols may likewise be used in lieu of the glycols, e. g. ethylene oxide and methanol may be employed for this purpose or if desired formaldehyde and water (formaldehyde hydrate, $H_2C(OH)_2$), may be first reacted with ethylene oxide under mild conditions and in the second step the resulting product reacted with methanol.

Aldehydes other than formaldehyde may be used, such, for example, as acetaldehyde, propanal, butanal, etc. When formaldehyde is referred to in the pending claims or in the specification, it will be understood that paraformaldehyde, formalin, trioxymethylene or other polymeric or monomeric forms of formaldehyde as well as formaldehyde are included as well as aqueous solutions such as those ranging up to 80% formaldehyde and higher.

From a consideration of the above specification, it will be appreciated that many changes may be made in the details therein given without departing from the scope of the invention or sacrificing any of the advantages that may be derived therefrom.

I claim:

1. A process for the preparation of a formal-alcohol which comprises heating a mixture of formaldehyde, a low molecular weight aliphatic monohydric alcohol, and ethylene glycol in accord with the equation:

$$CH_2O + ROH + HOCH_2CH_2OH \rightarrow H_2O + ROCH_2OCH_2CH_2OH$$

in which R is a hydrocarbon radical, stopping the reaction at substantial equilibrium and removing the compound $ROCH_2OCH_2CH_2OH$ from the reaction mixture.

2. The process in accord with claim 1, in which the formal-alcohol is removed by distillation after destroying the effectiveness of the catalyst.

3. A process for the preparation of an acetal-alcohol which comprises heating a mixture of an aldehyde, a monohydric aliphatic alcohol and ethylene glycol in the presence of an acidic catalyst, and destroying the effectiveness of the catalyst before separating the acetal-alcohol produced from the resulting reaction mixture.

4. A process for the preparation of a formal-alcohol which comprises heating a mixture of formaldehyde, a monohydric aliphatic alcohol, and ethylene glycol in contact with an acidic catalyst, and destroying the effectiveness of the catalyst before separating the formal-alcohol produced from the reaction mixture.

5. A process for the preparation of a formal-ether which comprises reacting, under reflux conditions, a mixture of formaldehyde, a lower aliphatic monohydric alcohol, and a monoalkyl ether of ethylene glycol in contact with an acidic catalyst, and after equilibrium has been substantially established neutralizing the catalyst and recovering by fractionation the formal-ether produced.

6. A process for the preparation of a formal-alcohol which comprises heating a mixture of the following approximate composition: 2 moles of formaldehyde, 3 moles of the monohydric alcohol, and 1 mole of ethylene glycol in contact with sulfuric acid as the catalyst, and neutralizing the catalyst before separating by distillation the formal-alcohol produced from the reaction mixture.

7. A process for the preparation of an acetal-ether which comprises heating a mixture of an aldehyde, a monohydric alcohol, and an alkyl ether of ethylene glycol in contact with an acidic catalyst and after equilibrium has been substantially established destroying the effectiveness of the catalyst and separating the acetal-ether therefrom.

8. A process for the preparation of an acetal-alcohol which comprises heating under reflux a mixture of acetaldehyde, an aliphatic monohydric alcohol, and ethylene glycol in contact with an acidic catalyst, and thereafter neutralizing the catalyst before recovering the acetal-alcohol from the reaction mixture.

9. In a process for the preparation of an acetal-alcohol the steps which comprise heating a mixture of an aldehyde, a monohydric alcohol, and ethylene glycol in contact with an acidic catalyst, after equilibrium has been substantially established, neutralizing the catalyst, separating the acetal-alcohol produced, and subsequently recycling the residue with make-up aldehyde, water, monohydric alcohol and ethylene glycol through the same series of steps.

10. A process for the preparation of (methoxymethoxy) ethanol which comprises introducing into a reaction zone formaldehyde, methanol and ethylene glycol, subsequently effecting the reaction therein by heating in the presence of an acidic catalyst and neutralizing the catalyst before separating the (methoxymethoxy) ethanol from the reaction mixture.

11. A process for the preparation of (methoxymethoxy) ethanol which comprises introducing into a reaction zone substantially equimolecular proportions of formaldehyde, methanol, and ethylene glycol, subsequently heating the mixture in contact with sulfuric acid as the catalyst and neutralizing the sulfuric acid before separating the (methoxymethoxy) ethanol from the reaction mixture.

RICHARD E. BROOKS.